United States Patent
Liu et al.

(10) Patent No.: US 9,971,383 B2
(45) Date of Patent: May 15, 2018

(54) FLEXIBLE SCREEN ASSEMBLY AND TERMINAL

(71) Applicant: SHENZHEN ROYOLE TECHNOLOGIES CO. LTD., Shenzhen (CN)

(72) Inventors: Zihong Liu, Shenzhen (CN); Xiang Zou, Shenzhen (CN); Songling Yang, Shenzhen (CN)

(73) Assignee: SHENZHEN ROYOLE TECHNOLOGIES CO., LTD., Shenzhen (CN)

( * ) Notice: Subject to any disclaimer, the term of this patent is extended or adjusted under 35 U.S.C. 154(b) by 0 days. days.

(21) Appl. No.: 15/538,838

(22) PCT Filed: Dec. 23, 2015

(86) PCT No.: PCT/CN2015/098510
§ 371 (c)(1),
(2) Date: Jun. 22, 2017

(87) PCT Pub. No.: WO2016/101897
PCT Pub. Date: Jun. 30, 2016

(65) Prior Publication Data
US 2017/0364121 A1  Dec. 21, 2017

Related U.S. Application Data

(63) Continuation of application No. PCT/CN2014/094601, filed on Dec. 23, 2014.

(51) Int. Cl.
*G06F 1/16* (2006.01)
*H05K 5/00* (2006.01)
(Continued)

(52) U.S. Cl.
CPC .......... *G06F 1/1652* (2013.01); *G06F 1/1616* (2013.01); *G09F 9/301* (2013.01)

(58) Field of Classification Search
CPC .... G06F 1/1652; G06F 1/1616; G06F 1/1613; G06F 1/16
(Continued)

(56) References Cited

U.S. PATENT DOCUMENTS 6,016,176 A * 1/2000 Kim .................. G02F 1/133305
                                              349/158
7,180,665 B2 * 2/2007 Daniel ................. G06F 1/1601
                                              160/373
(Continued)

*Primary Examiner* — Anthony Haughton
(74) *Attorney, Agent, or Firm* — Hauptman Ham, LLP

(57) ABSTRACT

A flexible screen assembly and a terminal are provided. The flexible screen assembly may include a first sliding element, a second sliding element, and a flexible screen. The second sliding element is slidably connected to the first sliding element, and may be slid to a first state of being overlapped with the first sliding element, and to a second state of being unfolded with respect to the first sliding element. The flexible screen is connected to the first sliding element and the second sliding element. In the first state, a portion of the flexible screen covers the second sliding element, and another portion is received into the first sliding element or the second sliding element. In the second state, the flexible screen is unfolded on the first sliding element and the second sliding element.

21 Claims, 13 Drawing Sheets

(51) Int. Cl.
*H05K 7/00* (2006.01)
*G09F 9/30* (2006.01)

(58) Field of Classification Search
USPC .............. 361/679.21–679.3, 679.55, 679.56
See application file for complete search history.

(56) References Cited

U.S. PATENT DOCUMENTS

| | | | | |
|---|---|---|---|---|
| 7,558,057 | B1* | 7/2009 | Naksen | G06F 1/1613 |
| | | | | 361/679.3 |
| 8,379,377 | B2* | 2/2013 | Walters | G06F 1/1641 |
| | | | | 248/917 |
| 8,493,726 | B2* | 7/2013 | Visser | G06F 1/1601 |
| | | | | 361/679.05 |
| 8,662,731 | B2* | 3/2014 | Wang | G09F 9/30 |
| | | | | 349/61 |
| 8,842,425 | B2* | 9/2014 | Ryu | G06F 1/1601 |
| | | | | 361/679.21 |
| 8,873,225 | B2* | 10/2014 | Huitema | G06F 1/1615 |
| | | | | 345/168 |
| 9,013,864 | B2* | 4/2015 | Griffin | H04M 1/0216 |
| | | | | 16/382 |
| 9,504,170 | B2* | 11/2016 | Rothkopf | H04M 1/0216 |
| 2001/0003450 | A1* | 6/2001 | Hemia | G06F 1/1615 |
| | | | | 345/170 |
| 2012/0314400 | A1* | 12/2012 | Bohn | G09F 9/301 |
| | | | | 362/97.1 |
| 2014/0355195 | A1* | 12/2014 | Kee | G06F 1/1616 |
| | | | | 361/679.27 |

* cited by examiner

FLEXIBLE SCREEN ASSEMBLY AND TERMINAL

TECHNICAL FIELD

The present disclosure relates to the field of display device, and particularly to a flexible screen assembly and a terminal.

BACKGROUND ART

Current terminal display devices have an increasingly strict requirement for the display size. Typical display devices are often restricted by the screen size, and there is usually a problem that a display device with a large screen cannot realize portability, for example, the display size of a tablet computer can meet the requirement, while the tablet computer usually needs to be placed in a computer bag, and cannot be placed in a pocket as a mobile phone. However, a display device which can realize portability cannot realize a large enough display size, for example, the mobile phone can be placed in a pocket very easily, but it is impossible to provide a very large display size for the mobile phone. Therefore, there is an urgent need for a display device which not only can realize a large enough screen size but also is portable.

SUMMARY

The present disclosure aims to provide a flexible screen assembly which has a large display size and is portable, and a terminal.

In order to solve the above technical problems, the present disclosure provides a flexible screen assembly. The flexible screen assembly may include a first sliding element, a second sliding element, and a flexible screen. The second sliding element is slidably connected to the first sliding element, and can be slid to a first state of being overlapped with the first sliding element, and to a second state of being unfolded with respect to the first sliding element. The flexible screen is connected to the first sliding element and the second sliding element. In the first state, a portion of the flexible screen covers the second sliding element, and another portion is received into the first sliding element or the second sliding element. In the second state, the flexible screen is unfolded on the first sliding element and the second sliding element.

The present disclosure further provides a terminal. The terminal includes the above mentioned flexible screen assembly.

For the flexible screen assembly and the terminal of the present disclosure, the first sliding element and the second sliding element can be overlapped with each other. At this point, the flexible screen is partially stacked on the second sliding element, so that small-size display can be realized, and it is also easy to carry. The first sliding element and the second sliding element also can be unfolded relative to each other. At this point, the flexible screen is unfolded on the first sliding element and the second sliding element to realize large-size display. Thus, the flexible screen assembly not only can satisfy the requirement of large-size display, but also can satisfy the requirement of portability.

BRIEF DESCRIPTION OF THE DRAWINGS

In order to illustrate the technical solutions of embodiments of the present disclosure more clearly, the accompanying drawings used in the description of the embodiments will be briefly described. Apparently, the accompanying drawings described in the following are some embodiments of the present disclosure, and a person skilled in the art can obtain other accompanying drawings without any creative effort.

DETAILED DESCRIPTION

Below technical solutions of embodiments of the present disclosure will be described clearly and completely in conjunction with the accompanying drawings of the embodiments of the present disclosure.

Figure 1:
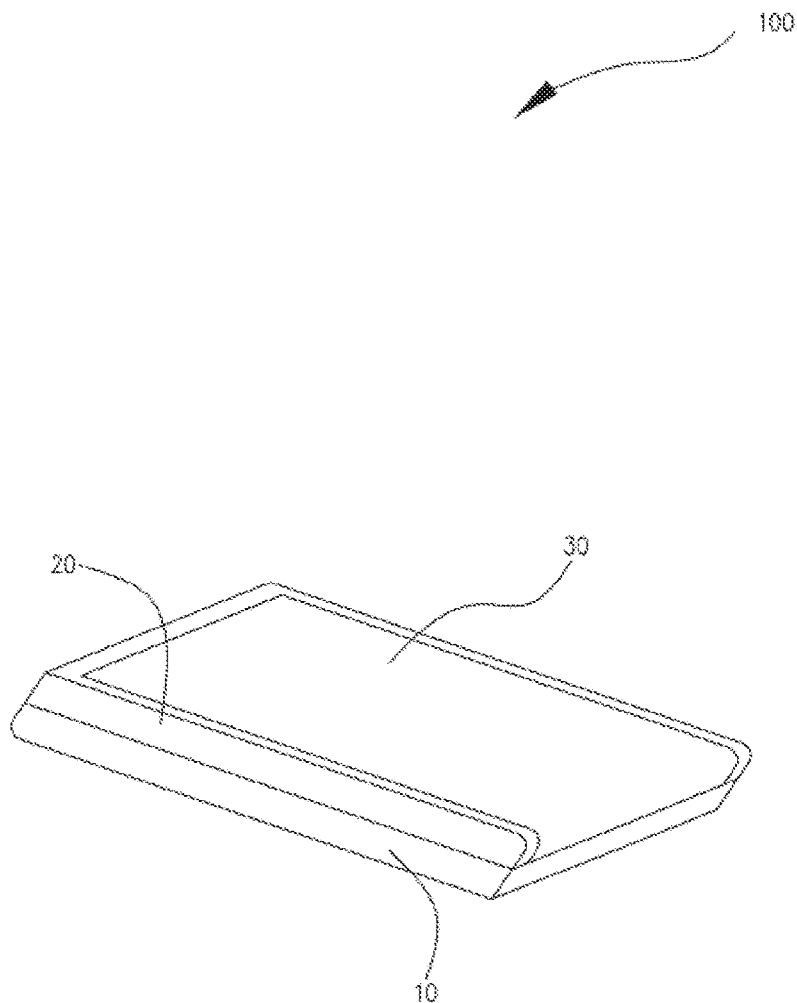
FIG. 1 is a schematic view of a flexible screen assembly in accordance with a first embodiment.
Figure 2:
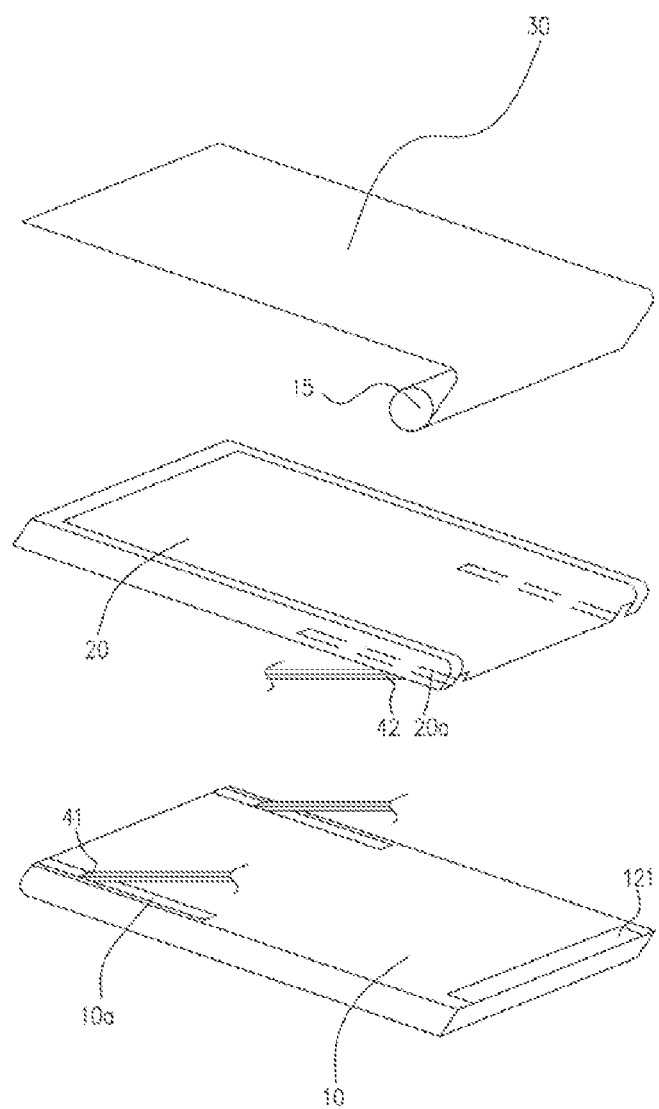
FIG. 2 is an exploded schematic view of the flexible screen assembly of FIG. 1.
Figure 3:
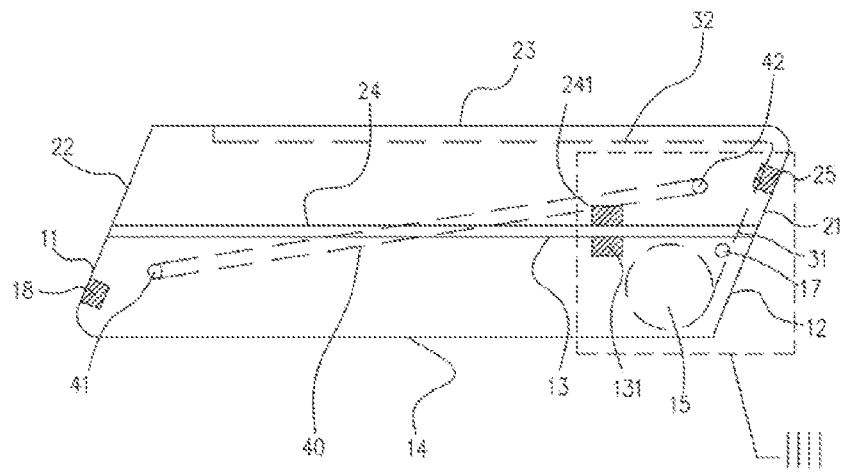
FIG. 3 is a lateral schematic view showing the flexible screen assembly of FIG. 1 in an overlapped state.

Referring to FIG. 1, FIG. 2, and FIG. 3, an embodiment of the present disclosure provides a flexible screen assembly 100. The flexible screen assembly 100 includes a first sliding element 10, a second sliding element 20, and a flexible screen 30. The second sliding element 20 is slidably connected to the first sliding element 10, and can be slid to a first state that the second sliding element 20 is overlapped with the first sliding element 10, and to a second state that the second sliding element 20 is unfolded with respect to the first sliding element 10. The flexible screen 30 is connected to the first sliding element 10 and the second sliding element 20. In the first state, a portion of the flexible screen 30 covers the second sliding element 20, and another portion is received into the first sliding element 10 or the second sliding element 20. In the second state, the flexible screen 30 is unfolded on the first sliding element 10 and the second sliding element 20. It can be understood that the flexible screen assembly 100 may be applied in a terminal device. The terminal device may be a portable device, such as a mobile phone, a tablet computer, an e-reader, and so on.

In the above embodiment, the flexible screen 30 is partially received into the first sliding element 10, so that a terminal using the flexible screen assembly 100 can realize small-size display, thus it is easy to carry the terminal. The flexible screen 30 is unfolded on the first sliding element 10 and the second sliding element 20, thus the terminal using the flexible screen assembly 100 can realize large-size display to satisfy the requirement of large-screen display.

Figure 4:
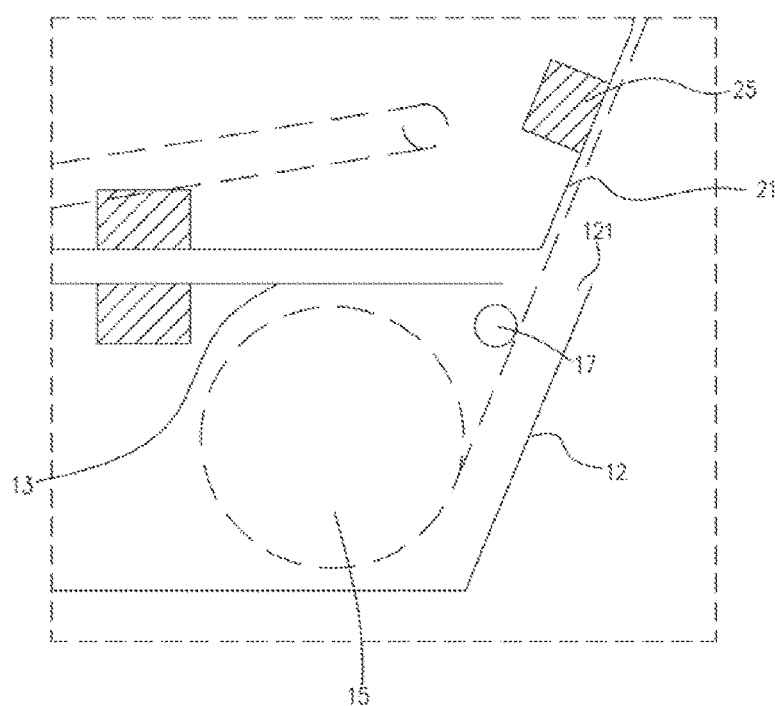
FIG. 4 is an enlarged schematic view of a fourth part of the flexible screen assembly of FIG. 3.

In the embodiment, the first sliding element 10 is a rectangular plate. The first sliding element 10 is hollow, and a control assembly, or a main board and control lines arranged on the main board of the flexible screen 30 can be provided in the first sliding element 10. The first sliding element 10 includes a first inner side surface 11 and a first outer side surface 12 arranged opposite to the first inner side surface 11. The first sliding element 10 further includes a first extension surface 13 connected between the first inner side surface 11 and the first outer side surface 12, and a first bottom surface 14 arranged opposite to the first extension surface 13. The structure of the second sliding element 20 is similar to the first sliding element 10, and the second sliding element 20 is parallel to the first sliding element 10. The second sliding element 20 includes a second inner side surface 21 and a second outer side surface 22 arranged opposite to the second inner side surface 21. The second sliding element 20 further includes a second extension surface 23 connected between the second inner side surface 21 and the second outer side surface 22, and a second bottom surface 24 arranged opposite to the second extension surface 23. The second sliding element 20 is slid along the first extension surface 13 and the first inner side surface 11 of the first sliding element 10, so that the second sliding element 20 can be overlapped with the first sliding element 10 or unfolded with respect to the first sliding element 10. When the second sliding element 20 is overlapped with the first sliding element 10, the first inner side surface 11 gets close to the second outer side surface 22, the first outer side surface 12 gets close to the second inner side surface 21, and the second inner side surface 21 is inwardly retracted by a certain distance with respect to the first outer side surface 12 (as shown in FIG. 4), so that it is convenient to extend the flexible screen 30 out of the first sliding element 10 via a through hole 121 (see the description below for details). The first extension surface 13 fits with the second bottom surface 24, so that it is convenient to receive the flexible screen 30 into the first sliding element 10 or the second sliding element 20, thus the overall volume of the flexible screen assembly 100 is reduced, and it is easy to carry the flexible screen assembly 100. The second sliding element 20 is slid towards the first inner side surface 11 along the first extension surface 13, and when the second sliding element 20 is slid to a state that the second sliding element 20 is unfolded with respect to the first sliding element 10, i.e., in the second state, the first inner side surface 11 abuts against the second inner side surface 21, the first outer side surface 12 is far away from the second outer side surface 22, the first extension surface 13 and the second extension surface 23 are coplanar and have the same orientation, and the first bottom surface 14 is flush with the second bottom surface 24, so that it is convenient to distribute the flexible screen 30 on the first sliding element 10 and the second sliding element 20. In other embodiments, the first sliding element 10 and the second sliding element 20 also may be semicircular plates. The first sliding element 10 and the second sliding element 20 also may be a rectangular block.

The flexible screen 30 is a flexible and bendable display screen. The flexible screen 30 adopts organic light-emitting diode (OLED) technology and shows good flexibility and good display performance. An edge of the flexible screen 30 can be fixed to the second sliding element 20, and another opposite edge can be received in or exposed out of the first sliding element 10, following sliding of the first sliding element 10 relative to the second sliding element 20. It may also be that an edge of the flexible screen 30 is fixed to the first sliding element 10, and another opposite edge can be received in or exposed out of the second sliding element 20, following sliding of the second sliding element 20 relative to the first sliding element 10. It may also be that two opposite edges of the flexible screen 30 are respectively received into or extend out of the first sliding element 10 and the second sliding element 20.

A first embodiment is provided. The first element 10 is hollow. Inside the first sliding element 10, a portion of the flexible screen 30 can be received, or a portion of the flexible screen 30 can be unfolded. Specifically, a first rotation shaft 15 is received in the first sliding element 10, and the first rotation shaft 15 is axially parallel to the first extension surface 13 and parallel to the first outer side surface 12 and the first inner side surface 11. The first rotation shaft 15 is rotated in the first sliding element 10 to wind a portion of the flexible screen 30 adjacent to the first sliding element 10.

The flexible screen 30 includes a first portion 31 that can be received into the first sliding element 10 and a second portion 32 fixed to the second sliding element 20. When the second sliding element 20 is slid to the first state, the first portion 31 is received into the first sliding element 10, and the second portion 32 is stacked on the second extension surface 23 of the second sliding element 20. When the second sliding element 20 is slid to the second state, the first portion 31 extends out of the first sliding element 10, and is stacked on the first extension surface 13 of the first sliding element 10, while the second portion 32 is still stacked on the second extension surface 23. Specifically, the first portion 31 includes a first side edge 311 (see FIG. 6) away from the second portion 32. The first side edge 311 is fixed to a peripheral side of the first rotation shaft 15. The first portion 31 is rotated with rotation of the first rotation shaft 15 in a certain direction, thus the first portion 31 is wound around the periphery of the first rotation shaft 15, and is further received into the first sliding element 10. Alternatively, the first portion 31 is rotated with rotation of the first rotation shaft 15 in another direction, thus the first portion 31 is unfolded from the periphery of the first rotation shaft 15 to extend out of the first sliding element 10. More specifically, the first rotation shaft 15 is adjacent to the first outer side surface 12, the first outer side surface 12 defines the through hole 121 in a position adjacent to the first extension surface 13, and the first portion 31 passes through the through hole 121 to be received into or extend out of the first sliding element 10 via the through hole 121. The second portion 32 includes a second side edge 321 fixed to the second sliding element 20, and the second side edge 321 (see FIG. 6) is adjacent to the second outer side surface 22. By means of fixing the second side edge 321 to the second sliding element 20, and by applying a pushing force to the second sliding element 20 to slide the second sliding element 20 from the first state to the second state, the second sliding element 20 exerts a pulling force on the second side edge 321 to pull the flexible screen 30, thereby pulling the first portion 31 wound around the first rotation shaft 15 out of the first sliding element 10. In other embodiments, the second sliding element 20 also may have the same structure as the first sliding element, that is, the second portion 32 also can be wound around a second rotation shaft arranged inside the second sliding element 20.

In the embodiment, a torsion spring (not indicated) is connected between the first rotation shaft 15 and the first sliding element 10. The torsion spring provides the first rotation shaft 15 with a restoring force to wind the first portion 31. When the second sliding element 20 is slid from the second state to the first state, the first rotation shaft 15 is rotated under the elastic effect of the torsion spring to wind the first portion 31 by itself, thus the first portion 31 of the flexible screen 30 is received into the first sliding element 10 by itself.

Figure 5:
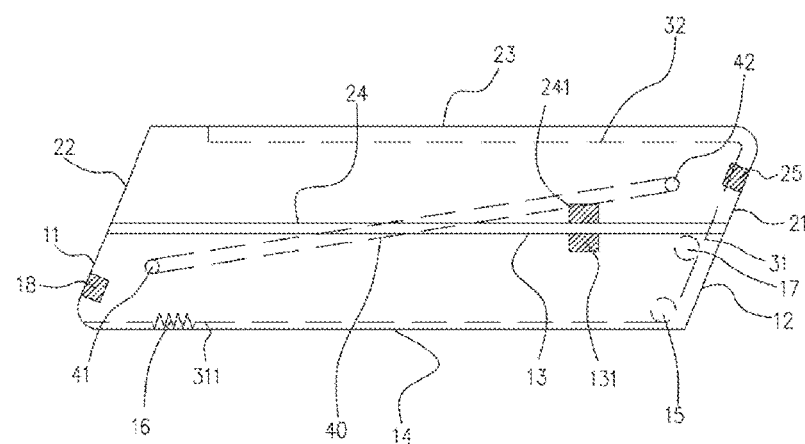
FIG. 5 is a lateral schematic view showing the flexible screen assembly of a second embodiment in an overlapped state.

A second embodiment is provided, as shown in FIG. 5, substantially the same as the first embodiment, it is different in that the side edge of the flexible screen 30 adjacent to the side edge of the first sliding element 10 bypasses the peripheral side of the first rotation shaft 15, and a first elastic element 16 is connected between the flexible screen 30 and the first sliding element 10. The first elastic element 16 is configured to provide a restoring force to receive the flexible screen 30 into the first sliding element 10.

Specifically, the first elastic element 16 is a rectangular spring. An end of the first elastic element 16 is fixed in the first sliding element 10, and is adjacent to the first inner side surface 11, i.e., arranged away from the first outer side surface 12. Another end of the first elastic element 16 is fixed to the first side edge 311 of the flexible screen 30. When a pulling force that the second sliding element 20 pulls the flexible screen 30 is larger than an elastic force of the first elastic element 16, the first portion 31 gradually extends out of the first sliding element 10 under the effect of the pulling force of the second sliding element 20. When the pushing force applied to the second sliding element 20 is removed, the first elastic element 16 pulls the first portion 31 to be received into the first sliding element 10, thereby driving the second sliding element 20 to slide to cause the second sliding element 20 to be overlapped with the first sliding element 10. More specifically, the first portion 31 bypasses the first rotation shaft 15, and partially fits with the first rotation shaft 15. The first portion 31, when being received into or extending out of the first sliding element 10, is slid relative to the first rotation shaft 15. By means of that the first rotation shaft 15 partially winds the first portion 31 and that the first rotation shaft 15 is rotatable, the frictional force between the first portion 31 and the first sliding element 10 is accordingly reduced, facilitating that the first portion 31 is received into or extends out of the first sliding element 10.

Figure 6:
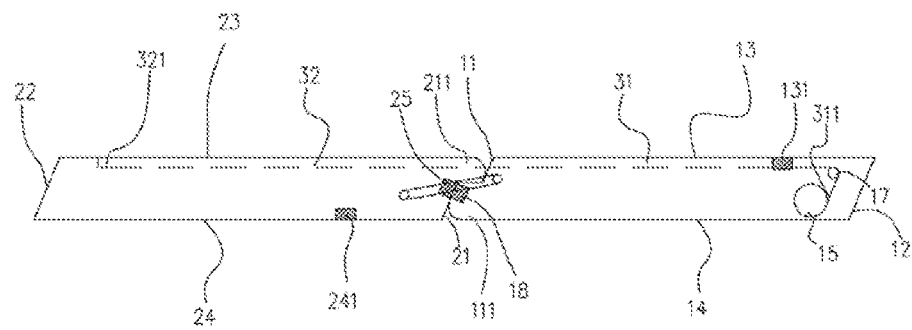
FIG. 6 is a lateral schematic view showing the flexible screen assembly of FIG. 1 in a second state.
Figure 7:
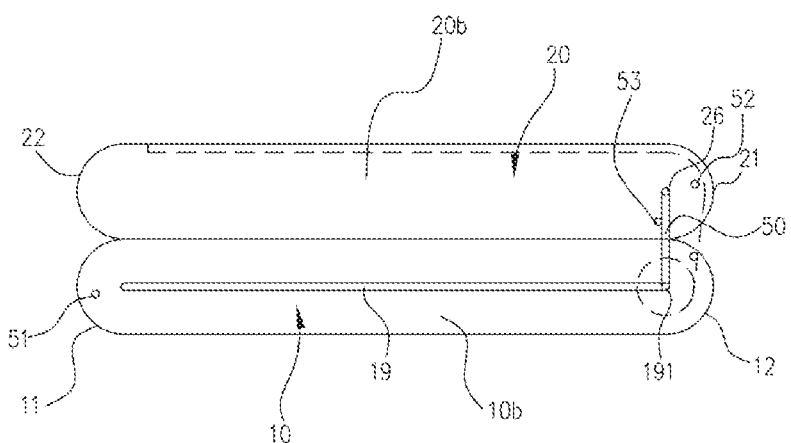
FIG. 7 is a lateral schematic view showing the flexible screen assembly of a third embodiment in a first state.
Figure 8:
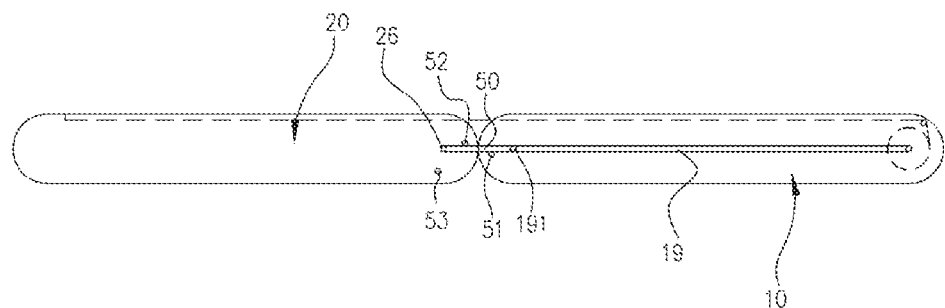
FIG. 8 is a lateral schematic view showing the flexible screen assembly of FIG. 7 in a second state.
Figure 9:
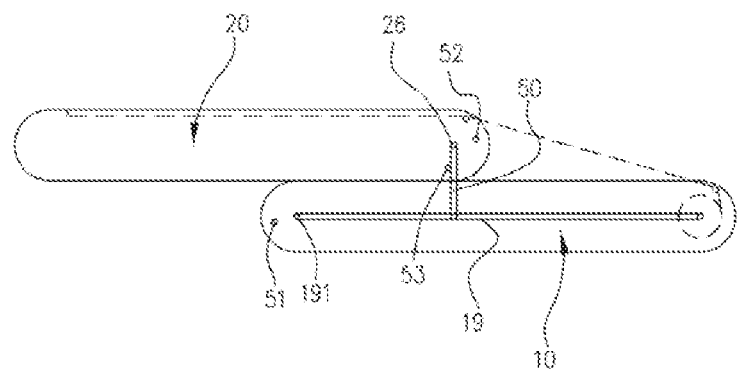
FIG. 9 is a lateral schematic view showing the flexible screen assembly of FIG. 7 switched from the second state to the first state.
Figure 10:
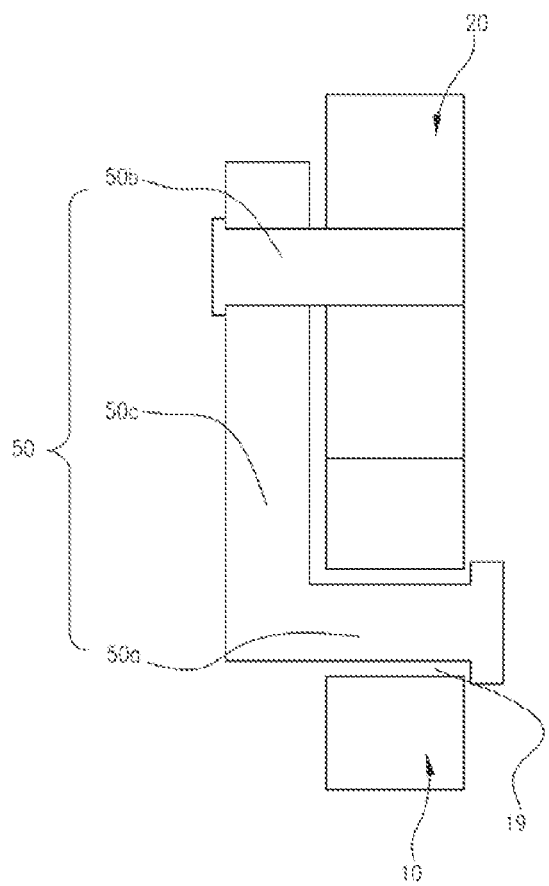
FIG. 10 is a partial schematic view showing a connecting rod, a first sliding element, and a second sliding element of the flexible screen assembly of FIG. 7.
Figure 11:
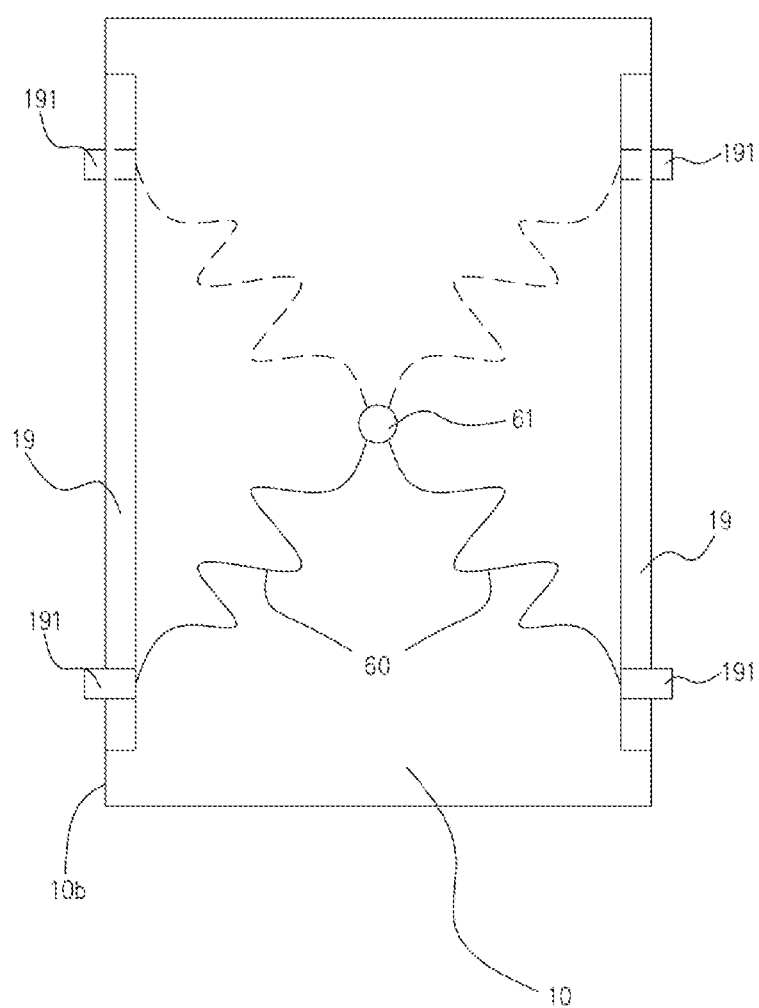
FIG. 11 is a top view of an inside of the first sliding element of the flexible screen assembly of FIG. 7.

Furthermore, still referring to FIG. 1, FIG. 3, and FIG. 6, in the first embodiment, an included angle is defined between the first inner side surface 11 and the first extension surface 13, and an included angle is defined between the second inner side surface 21 and the second extension surface 23. The angle between the first inner side surface 11 and the first extension surface 13 is complementary with the angle between the second inner side surface 21 and the second extension surface 23. Thus, when the second sliding element 20 is slid to the second state, the first inner side surface 11 and the second inner side surface 21 have opposite orientations and fit with each other, and the first extension surface 13 and the second extension surface 23 are located in the same plane and have the same orientation. Thus, the first sliding element 10 and the second sliding element 20 can be joined into a rectangular plate, so as to facilitate supporting the flexible screen 30, and enhancing the structural stability of the flexible screen assembly 10. More specifically, the first outer side surface 12 is parallel to the first inner side surface 11, and the second outer side surface 22 is parallel to the second inner side surface 21. When the second sliding element 20 is slid to the first state, the first inner side surface 11 is flush with the second outer side surface 22, and the first outer side surface 12 is flush with the second inner side surface 21. Thus, the first sliding element 10 and, the second sliding element 20 form a whole, further causing the structure of the flexible screen assembly 100 to be compact, and reducing the space occupied.

Furthermore, the included angle between the first inner side surface 11 and, the first extension surface 13 is an obtuse angle, and the included angle between the second inner side surface 21, and the second extension surface 23 is an acute angle. When the second sliding element 20 is slid from the first state to the second state, i.e., when the second sliding element 20 is slid from the first extension surface 13 to the first inner side surface 11, since the included angle between the first inner side surface 11 and the first extension surface 13 is an obtuse angle, when the second sliding element 20 is slid to the second state along the first inner side surface 11, the sliding resistance applied to the second sliding element 20 is reduced due to the first inner side surface 11. The included angle between the second inner side surface 21 and the second extension surface 23 is an acute angle, so that it is convenient to slide the first sliding element 10 relative to the second sliding element 20, and increase the adaptability of the first sliding element 10 to the second sliding element 20. In other embodiments, both the first inner side surface 11 and the second inner side surface 21 also may be wedge-shaped surfaces, or both the first inner side surface 11 and the second inner side surface 21 include a quarter arc surface, and the first inner side surface 11 and the second inner side surface 21 also may be semicircular arc surfaces.

Furthermore, the first sliding element 10 is provided with a second rotation shaft 17 on a side opposite to the first inner side surface 11. The second rotation shaft 17 is adjacent to the first extension surface 13, and is axially parallel to the first rotation shaft 15. A peripheral side portion of the second rotation shaft 17 winds the flexible screen 30, and the flexible screen 30 bypasses the peripheral side portion of the second rotation shaft 17 and extends out of the first extension surface 13 via the through hole 121.

Specifically, the second rotation shaft 17 is adjacent to the first extension surface 13 and the first outer side surface 12, and the through hole 121 is defined in the first extension surface 13, so that the first portion 31 partially bypasses the second rotation shaft 17 and partially passes through the through hole 121. By means of that the first portion 31 is partially wound around the second rotation shaft 17, it is ensured that when the first portion 31 is in a state of being unfolded on the first extension surface 13, a bending radius of the first portion 31 is within a deflection range, so as to prevent the first portion 31 from being ineffective due to deflection. Furthermore, by means of that the first portion 31 is slid on an arc peripheral side surface of the second rotation shaft 17, the sliding frictional force of the first portion 31 inside the first sliding element 10 is reduced, so as to ensure the safety performance of the flexible screen 30, and prolong the service life of the flexible screen assembly 10. In other embodiments, a roller also can be sleeved on the second rotation shaft 17, and the roller is configured to further reduce the frictional force between the flexible screen 30 and the second rotation shaft 17.

Furthermore, the first inner side surface 11 is provided with a first fixing element 18, and the second inner side surface 21 is provided with a second fixing element 25. When the first inner side surface 11 fits with the second inner side surface 21, as shown in FIG. 6, the first fixing element 18 is fixedly connected to the second fixing element 25.

In the embodiment, both the first fixing element 18 and the second fixing element 25 are magnets. The first fixing element 18 and the second fixing element 25 are fixed with each other through a magnetic force. A pushing force is applied by a user to the second sliding element 20 or the first sliding element 10, and under a condition that the pushing force is larger than the magnetic force between the first fixing element 18 and the second fixing element 25, the second sliding element 20 is slid relative to the first sliding element 10. By means of that the first fixing element 18 is fixedly connected to the second fixing element 25, when the second sliding element 20 is unfolded relative to the first sliding element 10, the second sliding element 20 is fixed relative to the first sliding element 10, so that the structure of the flexible screen assembly 100 is stable. In other embodiments, the first fixing element 18 also can be fixed to an inner sidewall of the first sliding element 10 and adjacent to the first inner side surface 11, and the second fixing element 25 also can be fixed to an inner sidewall of the second sliding element 20 and adjacent to the second inner side surface 21. The first fixing element 18 also may be a buckle, and the second fixing element 25 also may be a buckle hole, and the first fixing element 18 and the second fixing element 25 also may be snap-fitted.

Furthermore, the first inner side surface 11 is provided with a first positioning portion 111, and the second inner side surface 21 is provided with a second positioning portion 211. When the first inner side surface 11 fits with the second inner side surface 21, as shown in FIG. 6, the first positioning portion 111 engages with the second positioning portion 211.

In the embodiment, the first positioning portion 111 and the second positioning portion 211 respectively are steps engageable with each other. Specifically, the first positioning portion 111 is arranged on a position of the first inner side surface 11 adjacent to the first bottom surface 14, and the second positioning portion 211 is arranged on a position of the second inner side surface 21 adjacent to the second extension surface 23. When the second sliding element 20 is slid to the second state, the second inner side surface 21 fits with the first inner side surface 11, and the second positioning portion 211 engages with the first positioning portion 111, to prevent further sliding of the second sliding element 20 relative to the first sliding element 10, so that the second sliding element 20 and the first sliding element 10 are kept in an unfolded state, thereby ensuring the stability of the flexible screen assembly 100. In other embodiments, the first positioning portion 111 also may be a groove, and the second positioning portion 211 also may be a boss.

Furthermore, the first extension surface 13 is provided with a third fixing element 131, and a side of the second sliding element 20 facing away from the second extension surface 23 is provided with a fourth fixing element 241. When the second sliding element 20 is slid to the first state, as shown in FIG. 3, the third fixing element 131 is fixedly connected to the fourth fixing element 241.

In the embodiment, both the third fixing element 131 and the fourth fixing element 241 are magnets, and the third fixing element 131 and the fourth fixing element 241 are magnetically fixed with each other. A pushing force is applied by a user to the second sliding element 20 or the first sliding element 10, and under the condition that the pushing force is larger than the magnetic force between the third fixing element 131 and the fourth fixing element 241, the second sliding element 20 is slid relative to the first sliding element 10, and the second sliding element 20 is slid from the first state to the second state. By means of that the third fixing element 131 is fixedly connected to the fourth fixing element 241, when the second sliding element 20 is overlapped with the first sliding element 10, the second sliding element 20 is fixed relative to the first sliding element 10, so that the structure of the flexible screen assembly 100 is stable. In other embodiments, the third fixing element 131 also can be fixed to the inner sidewall of the first sliding element 10 and is adjacent to the first extension surface 13, and the fourth fixing element 241 also can be fixed to the inner sidewall of the second sliding element 20 and is adjacent to the second bottom surface 24. The third fixing element 131 also may be a buckle, the fourth fixing element 241 also may be a buckle hole, and the third fixing element 131 and the fourth fixing element 241 also may be snap-fitted.

Furthermore, referring to FIG. 2 and FIG. 3, the flexible screen assembly 100 further includes a second elastic element 40, and the second elastic element 40 is elastically connected between the first sliding element 10 and the second sliding element 20 for providing an elastic force to the second sliding element 20 sliding from the first state to the second state.

In the embodiment, the second elastic element 40 may be a rectangular spring. The second elastic element 40 includes a first end 41 and a second end 42 arranged opposite to the first end 41. The first end 41 is fixed to a position of the first sliding element 10 adjacent to the first inner side surface 11, and the second end 42 is fixed to a position of the second sliding element 20 adjacent to the second inner side surface 21. Specifically, the first sliding element 10 defines a first receiving slot 10a, the length direction of the first receiving slot 10a is parallel to the direction of sliding of the second sliding element 20 relative to the first sliding element 10, and the first receiving slot 10a is provided with an opening at the first extension surface 13 and the first inner side surface 11. The first end 41 is fixed in the first receiving slot 10a, so that the second end 42 passes through the opening of the first receiving slot 10a, and is further fixedly connected to the second sliding element 20, and furthermore, when the second sliding element 20 is slid relative to the first sliding element 10, the second elastic element 40 is rotated in the first receiving slot 10a. When the second sliding element 20 is slid to the first state, the second elastic element 40 is lengthened, the elastic force of the second elastic element 40 is less than the magnetic force between the third fixing element 131 and the fourth fixing element 241, thus the second sliding element 20 is fixed relative to the first sliding element 10. When a force is applied to the second sliding element 20, the third fixing element 131 is disengaged from the fourth fixing element 241, and when the force applied to the second sliding element 20 is removed, under the elastic effect of the second elastic element 40, the second sliding element 20 is slid relative to the first sliding element 10, thus facilitating the operation of the flexible screen assembly 100. It can be understood that the second sliding element 20 defines a second receiving slot 20a, and the second receiving slot 20a is provided with an opening on the second bottom surface 24 and the second inner side surface 21. The second end 42 is fixed in the second receiving slot 20a, thus it is convenient to connect the second elastic element 40 between the second sliding element 20 and the first sliding element 10 without affecting the sliding of the second sliding element 20 relative to the first sliding element 10. Furthermore, the first sliding element 10 and the second sliding element 20 also can be respectively provided with a sliding rail and a sliding slot engageable with each other, so as to facilitate the sliding of the second sliding element 20 relative to the first sliding element 10. In other embodiments, the first end 41 and the second end 42 also can be slidably connected to the first receiving slot 10a and the second receiving slot 20a respectively, so as to decrease the stretch length of the second elastic element 40 and reduce the fatigue degree of the second elastic element 40, thereby prolonging the service life of the second elastic element 40 and enhancing the safety performance of the flexible screen assembly 100.

The present disclosure further provides a third embodiment, referring to FIGS. 7-11, substantially the same as the first embodiment, it is different in that the flexible screen assembly 100 includes a connecting rod 50, an end of the connecting rod 50 is rotatable and is slidably connected to the first sliding element 10, and another end of the connecting rod 50 is rotatably connected to the second sliding element 20. The connecting rod 50 is slid with sliding of the second sliding element 20 relative to the first sliding element 10, and the connecting rod 50 is rotated relative to the first sliding element 10 and the second sliding element 20 when the second sliding element 20 is slid from the state that the second sliding element 20 is overlapped with the first sliding element 10 to the state that the second sliding element 20 is unfolded relative to the first sliding element 10.

In the embodiment, the first sliding element 10 defines a sliding slot 19. The connecting rod 50 includes a first connecting rod rotation shaft 50a slidable in the sliding slot 19, a second connecting rod rotation shaft 50b fixed to the second sliding element 20 and substantially parallel to the first connecting rod rotation shaft 50a, and a main body 50c fixedly connected to the first connecting rod rotation shaft 50a and rotatably connected to the second connecting rod rotation shaft 50b. Specifically, the first sliding element 10 further includes two first assisting side surfaces 10b arranged opposite to each other and connected between the first inner side surface 11 and the first outer side surface 12. The two first assisting side surfaces 10b, the first inner side surface 11, and the first outer side surface 12 cooperatively form the peripheral side of the first sliding element 10. The sliding slot 19 is defined in the first assisting side surface 10b, and the length direction of the sliding slot 19 is parallel to the first extension surface 13. An end of the first connecting rod rotation shaft 50a is slidably connected to the sliding slot 19, and another end extends out of the sliding slot 19. More specifically, the second sliding element 20 includes two second assisting side surfaces 20b arranged opposite to each other and connected between the second inner side surface 21 and the second outer side surface 22. The two second assisting side surface 20b, the second inner side surface 21, and the second outer side surface 22 cooperatively form the peripheral side of the second sliding element 20. An end of the second connecting rod rotation shaft 50b is fixed to the second assisting side surface 20b.

It can be understood that when the second sliding element 20 is stacked on the first sliding element 10 and is slid along the first extension surface 13, the second sliding element 20 drives the second connecting rod rotation shaft 50b to slide relative to the first sliding element 10, thus the second connecting rod rotation shaft 50b drives the main body 50c and the first connecting rod rotation shall 50a to slide relative to the first sliding element 10. The first connecting rod rotation shaft 50a is slidably connected to the sliding slot 19, so that the second sliding element 20 cannot be easily disengaged from the first sliding element 10, and the structure of the flexible screen assembly 100 is stable.

It also can be understood that when the first connecting rod rotation shaft 50a is slid to an end of the sliding slot 19 adjacent to the first inner side surface 11, the second sliding element 20 is slid to the first inner side surface 11, so that the second sliding element 20 is slid along the first inner side surface 11, at this point the second sliding element 20 drives the second connecting rod rotation shaft 50b to slide along the first inner side surface 11. Both the first inner side surface 11 and the second inner side surface 21 are semicircular arc surfaces, thus the second connecting rod rotation shaft 50b drives the connecting rod 50 to rotate, so that it is convenient to slide the second sliding element 20 to a position where the second sliding element 20 is unfolded relative to the first sliding element 10. In other embodiments, the sliding slot 19 may be defined in the second sliding element 20. The second connecting rod rotation shaft 50b is slidably connected to the sliding slot 19 and is rotatably connected to an end of the main body 50c. The first connecting rod rotation shaft 50a is fixed to the first sliding element 10 and is rotatably connected to another end of the connecting rod 50.

Furthermore, the first sliding element 10 is provided with a first limiting portion 51 on an end adjacent to the sliding slot 19. The first limiting portion 51 prevents further rotation of the connecting rod 50 after the first sliding element 10 and the second sliding element 20 are unfolded.

In the embodiment, the first limiting portion 51 is a limiting post fixed to the first assisting side surface 10b. The first limiting portion 51 is arranged between the sliding slot 19 and the first inner side surface 11. When the first connecting rod rotation shaft 50a, is slid to an end of the sliding slot 19 adjacent to the first inner side surface 11, the main body 50c is rotated with rotation of the first connecting rod rotation shaft 50a. When the second sliding element 20 is slid to the position where the second sliding element 20 is unfolded relative to the first sliding element 10, the first limiting portion 51 blocks the connecting rod 50, i.e., the first limiting portion 51 abuts against the connecting rod 50 to prevent further rotation of the connecting rod 50, thereby preventing further sliding of the second sliding element 20 relative to the first sliding element 10, so that the flexible screen assembly 100 has a stable state and is easy to be operated. In other embodiments, the first limiting portion 51 also may be a boss or a baffle.

Furthermore, the second sliding element 20 is provided with a second limiting portion 52 at a position adjacent to the second connecting rod rotation shaft 50b, and the second limiting portion 52 prevents further rotation of the connecting rod 50 after the first sliding element 10 and the second sliding element 20 are unfolded.

In the embodiment, the second limiting portion 52 has the same structure as the first limiting portion 51, and the second limiting portion 52 is arranged between the second inner side surface 21 and the second connecting rod rotation shaft 50b. When the first sliding element 10 is slid relative to the second sliding element 20 to the position where the first sliding element 10 is unfolded relative to the second sliding element 20, the second limiting portion 52 blocks the connecting rod 50, i.e., the second limiting portion 52 abuts against a side of the connecting rod 50 facing away from the first limiting portion 51 to prevent further rotation of the connecting rod 50, thereby preventing further sliding of the first sliding element 10 relative to the second sliding element 20.

Furthermore, the second sliding element 20 is provided with a third limiting portion 53 at a position adjacent to the second connecting rod rotation shaft 50b, and the third limiting portion 53 prevents the connecting rod 50 from rotating when the first sliding element 10 and the second sliding element 20 are overlapped with each other.

In the embodiment, the third limiting portion 53 has the same structure as the first limiting portion 51, and is spaced from the second limiting portion 52. When the second sliding element 20 is slid from the second state to the first state, the connecting rod 50 is rotated a certain angle relative to the second sliding element 20, the third limiting portion 53 prevents further rotation of the connecting rod 50, i.e., the third limiting portion 53 abuts against a side of the connecting rod 50 adjacent to the first limiting portion 51, so that the third limiting portion 53 pushes the connecting rod 50 to slide relative to the first sliding element 10, thus finally realizing overlapping of the second sliding element 20 and the first sliding element 10.

Furthermore, the first sliding element 10 is provided with an abutment portion 61 outside the sliding slot 19. A third elastic element 60 is connected between the abutment portion 61 and the first connecting rod rotation shaft 50a, and the third elastic element 60 provides a restoring force to slide the first connecting rod rotation shaft 50a towards two ends of the sliding slot 19.

In the embodiment, each of the first assisting side surfaces 10b defines the sliding slot 19, and the first connecting rod rotation shaft 50a passes through the first assisting side surfaces 10b to extend into the first sliding element 10. The abutment portion 61 is a positioning post fixed in the first sliding element 10. The abutment portion 61 may be located in a geometrical central position of the first sliding element 10 so that the first connecting rod rotation shaft 50a is always under the elastic effect of the third elastic element 60 at any position of the sliding slot 19. The third elastic element 60 is a serpentine spring. There are two third elastic elements 60. Two ends of the two third elastic elements 60 are together fixed to a position of the abutment portion 61, and other ends are fixed to different positions of the first connecting rod rotation shaft 50a. Thus, by means of the elastic effect of the third elastic elements 60, the first connecting rod rotation shaft 50a is slid to two ends of the sliding slot 19 by itself, so that it is convenient to slide the second sliding element 20 relative to the first sliding element 10, thus facilitating the operation of the flexible screen assembly 100. In other embodiments, the third elastic elements 60 also may be rectangular compression springs.

Figure 12:
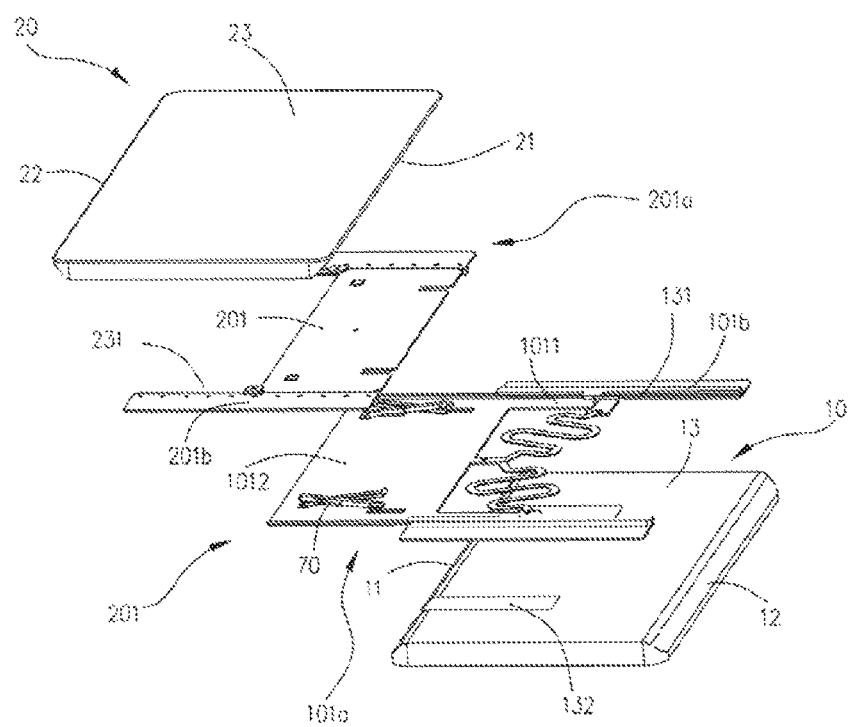
FIG. 12 is an exploded schematic view of a flexible screen assembly in accordance with a fourth embodiment of the present disclosure.
Figure 13:
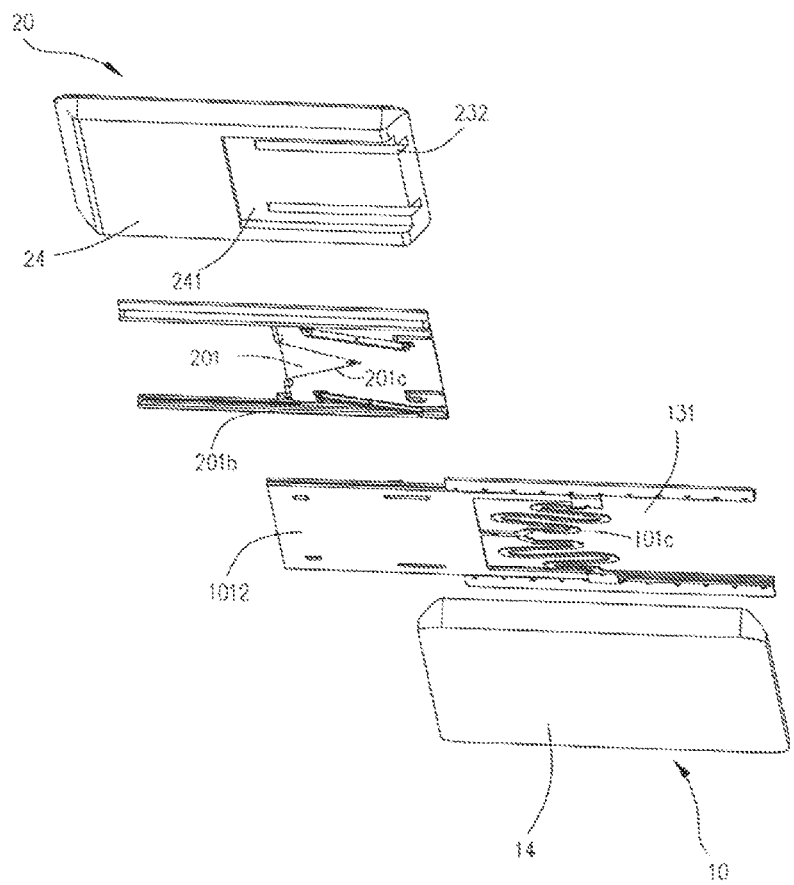
FIG. 13 is an exploded schematic view of the flexible screen assembly of FIG. 12, viewed from another view point.
Figure 14:
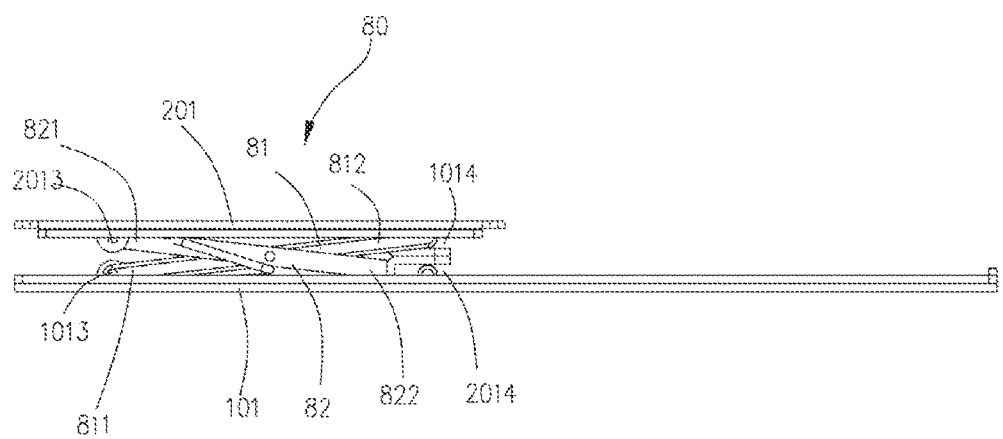
FIG. 14 is an assembled schematic view of a first connector and a second connector of the flexible screen assembly of FIG. 12.

Referring to FIG. 12, FIG. 13, and FIG. 14, the present disclosure further provides a fourth embodiment, different from the first embodiment, the flexible screen assembly further includes a first connector 101, a second connector 201, and a fourth elastic element 70. The first connector 101 is provided with a first guiding mechanism 101a. The first connector 101 is slidably connected to the first guiding mechanism 101a along a first direction, and under the guidance of the first guiding mechanism 101a, the first connector 101 can be slid to a first position where the first sliding element 10 and the first sliding element 20 are overlapped with each other and a second position where a dislocation is generated between at least a portion of the first sliding element 10 and the first sliding element 10. The second sliding element 20 is provided with a second guiding mechanism 201a. The second connector 201 is slidably connected to the second guiding mechanism 102a along a second direction, and under the guidance of the second guiding mechanism 102a, the second connector 201 can be slid to a third position adjacent to the first sliding element 10 and a fourth position away from the first sliding element 10. The second direction is parallel to the first direction.

Figure 16:
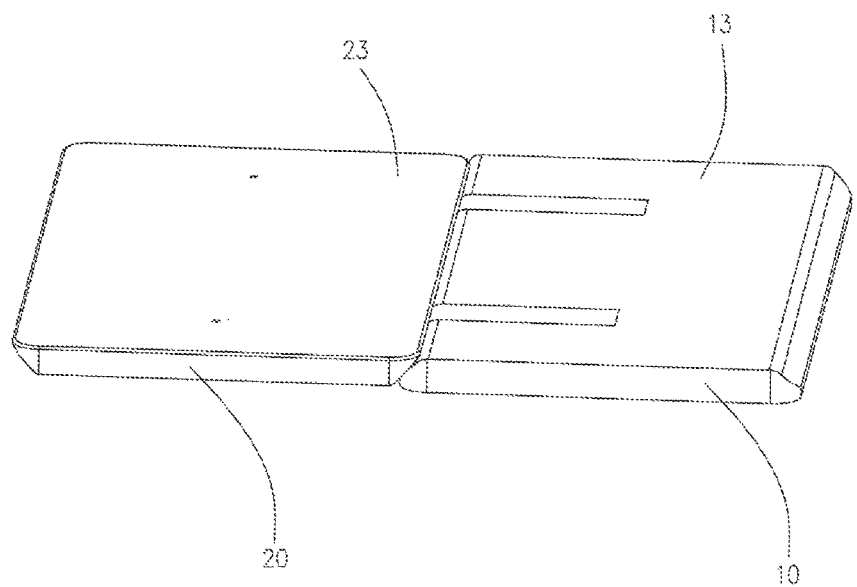
FIG. 16 is a schematic view showing the flexible screen assembly of FIG. 12 in a second state.
Figure 17:
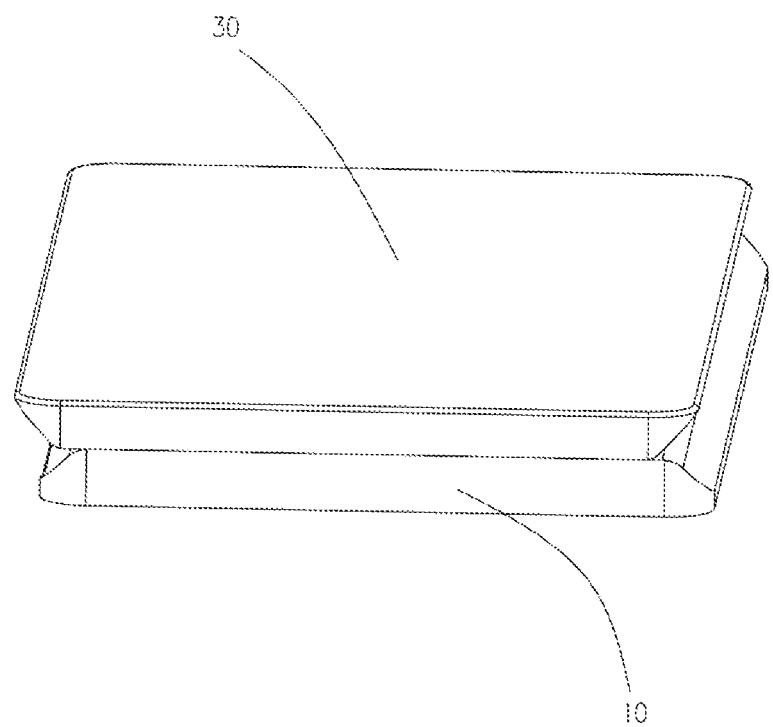
FIG. 17 is a schematic view showing the flexible screen assembly of FIG. 12 in a first state.
Figure 18:
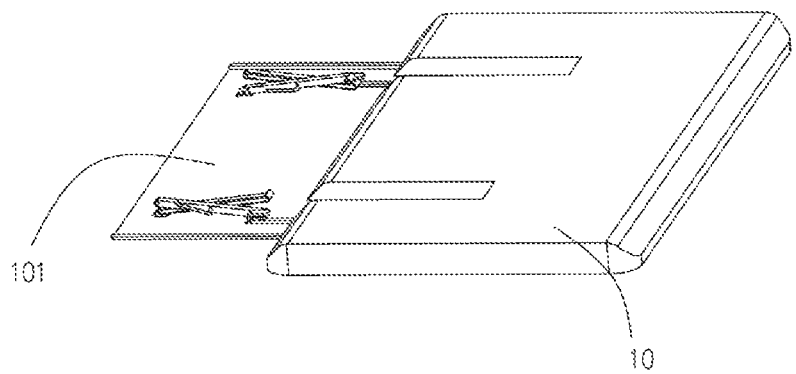
FIG. 18 is a schematic view showing the first connector of the flexible screen assembly of FIG. 12 sliding to a second position with respect to the first sliding element.
Figure 19:
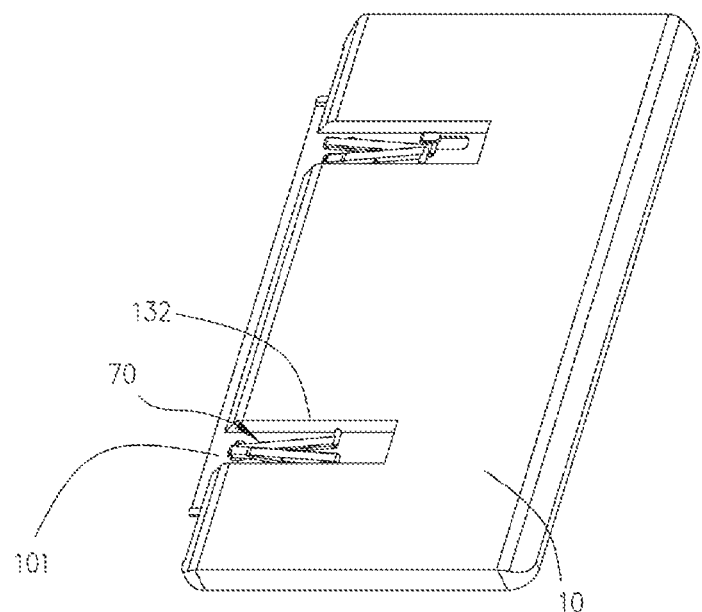
FIG. 19 is a schematic view showing the first connector of the flexible screen assembly of FIG. 12 sliding to a first position with respect to the first sliding element.

In the first state, in combination with FIG. 17, FIG. 18, and FIG. 19, the first connector 101 is located in the first position and the second connector 201 is located in the fourth position. In the second state, in combination with FIG. 16, FIG. 18, and FIG. 19, the first connector 101 is located in the second position, the second connector 201 is located in the third position, and the first sliding element 10 and the second sliding element 20 keep side by side under the elastic effect of the fourth elastic element 70.

In the embodiment, the first guiding mechanism 101a may be a sliding slot defined in the first sliding element 10, also may be a guiding rail provided on the first sliding element 10, and also may be an insertion slot or an insertion hole defined in the first sliding element 10. The first guiding mechanism 101a can guide the first connector 101 to slide relative to the first sliding element 10 along the first direction. The first direction is parallel to a surface of the first sliding element 10 supporting the flexible screen 30. When the first connector 10 is in the first position, the first guiding mechanism 101a can guide the first connector 10 to expand the supporting surface of the first connector 10.

In the embodiment, the second guiding mechanism 201a may be a sliding slot defined in the second sliding element 20, also may be a guiding rail provided on the second sliding element 20, and also may be an insertion slot or an insertion hole defined in the second sliding element 20. The second guiding mechanism 201a can guide the second connector 201 to slide relative to the second sliding element 20 along the second direction. The second direction is parallel to a surface of the second sliding element 20 supporting the flexible screen 30. Since the second direction is parallel to the first direction, i.e., the second sliding element 20 can be slid relative to the first sliding element 10, the second sliding element 20 and the first sliding element 10 may be overlapped with each other or a dislocation may be generated between the second sliding element 20 and the first sliding element 10. That is, the second guiding mechanism 201a can guide the second connector 201 to slide relative to the second sliding element 20, and also guide the second sliding element 20 to slide relative to the first sliding element 10.

In the embodiment, a side of the first guiding mechanism 101a facing away from the first extension surface 13 defines a first sliding slot 130. The first sliding slot 130 extends from the first inner side surface 11 to the first outer side surface 12, and an extending direction of the first sliding slot 130 is parallel to the first extension surface 13.

The first connector 101 includes a connecting portion 1011 and a supporting portion 1012. The connecting portion 1011 is slidably connected to the first sliding slot 131, and the supporting portion 1012 is fixed to a side of the connecting portion 1011, and can be slid into or out of the first sliding slot 131.

The second connector 201 is provided opposite to the supporting portion 1012, arranged at a side of the first connector 101 away from the first extension surface 13, and can get away from or approach the first connector 101 along a direction perpendicular to the first extension surface 13.

The fourth elastic element 70 is connected between the supporting portion 1012 and the second connector 201 for providing a restoring force to cause the second connector 201 to approach the supporting portion 1012.

A side of the second guiding mechanism 201a facing away from the second extension surface 23 further defines a second sliding slot 231. The second sliding slot 231 extends from the second inner side surface 21 to the second outer side surface 22, and the extending direction of the second sliding slot 231 is parallel to that of the first sliding slot 131. The second connector 201 is slidably connected to the second sliding slot 231.

When the supporting portion 1012 is slid out of the first sliding slot 131, a dislocation is generated between the supporting portion 1012 and the first sliding element 10, i.e., the first connector 101 is slid to the second position, and under the elastic effect of the fourth elastic element 70, the first connector 101 approaches the second connector 201. The second connector 201 is also slid to get close to the second inner side surface 21 of the second sliding element 20, i.e., the second connector 201 is slid to a position where the second sliding element 20 is close to the first sliding element 10, i.e., when the second connector 201 is slid to the third position, the second sliding element 20 can be unfolded relative to the first sliding element 10, i.e., the second sliding element 20 and the first sliding element 10 are arranged side by side.

When the supporting portion 1012 is slid into the first sliding slot 131, the supporting portion 1012 is overlapped with the first sliding element 10, i.e., the first connector 101 is slid to the first position, the second connector 201 is slid to get close to the second outer side surface 22 of the second sliding element 20, i.e., the second connector 201 is slid to a position of the second sliding element 20 away from the first sliding element 10, i.e., when the second connector 201 is slid to the fourth position, the second connector 201 is stacked on the first sliding element 10, so that the second sliding element 20 and the first sliding element 10 are overlapped with each other, and the second sliding element 20 is slid to the first state.

In the embodiment, the first sliding element 10 is a housing, and the first sliding element 10 is hollow to define a first receiving cavity (not indicated). An opening end of the first receiving cavity is defined on the first inner side surface 11 so that the first connector 101 can be received in the first receiving cavity through the opening end. The first guiding mechanism 101a includes two first slide guiding strips 101b received in the first receiving cavity. The first slide guiding strips 101b are fixed to an inner wall of the first receiving cavity, and extend from the first inner side surface 11 to the first outer side surface 12. The first sliding slot 131 is provided between the two first slide guiding strips 101b, and an insertion opening (not indicated) of the first sliding slot 131 is defined on the first inner side surface 11. It can be understood that the first connector 101 can be inserted into the first sliding slot 131 from the opening end of the first receiving cavity. In other embodiments, the first sliding slot 131 also may be a through hole extending through the first inner side surface 11 and the first outer side surface 12.

In the embodiment, the first connector 101 is a rectangular plate, and the first connector 101 is parallel to the first upper surface 13. When the first connector 101 is slid to the first position, the first connector 101 is located between the first inner side surface 11 and the first outer side surface 12, and when the first connector 101 is slid to the second position, the first connector 101 is at least partially located at a side of the first inner side surface 11 facing away from the first outer side surface 12. Specifically, the first connector 101 can be inserted into the first sliding slot 131, and the connecting portion 1011 and the supporting portion 1012 are integrally formed. When the connecting portion 1011 gets away from the insertion opening of the first sliding slot 131, the supporting portion 1012 is slid into the first sliding slot 131 and is adjacent to the insertion opening of the first sliding slot 131, i.e., adjacent to the first inner side surface 11. When the connecting portion 1011 gets close to the insertion opening of the first sliding slot 131, the supporting portion 1012 is slid out of the first sliding slot 131. In other embodiments, the first sliding element also may be a rod element, and the connecting portion and the supporting portion are respectively provided on two ends of the first sliding element.

In the embodiment, the second connector 201 is a rectangular plate, the second connector 201 is parallel to the first connector 101, and the second connector 201 can be slid relative to the first sliding element 10 together with the first connector 101. When the supporting portion 1012 is located in the first sliding slot 131, and meanwhile a force is applied to the second sliding element 20 to cause the second sliding element 20 to get away from the supporting portion 1012 in a direction perpendicular to the second sliding element 20, the second sliding element 20 is stacked on the first extension surface 13. When the supporting portion 1012 is slid out of the first sliding slot 131, and meanwhile the second connector 20 approaches the supporting portion 1012 under the elastic effect of the fourth elastic element 70, the second connector 201 is located at a side of the first inner side surface 11 facing away from the first outer side surface 12, the second connector 201 drives the second sliding element 20 to get close to the first sliding element 10 in a direction perpendicular to the second connector 201, and finally, the second sliding element 20 and the first sliding element 10 are arranged side by side, i.e., the second sliding element 20 is slid to the second state. In other embodiments, the second connector also may be a rod element, and the second connector also may be a sliding block.

In the embodiment, the fourth elastic element 70 may be a rectangular spring, also may be a torsion spring, and also may be a shaped spring. Specifically, the fourth elastic element 70 is a torsion spring, the fourth elastic element 70 is in a pre-deformed state to cause the second connector 201 to abut against the supporting portion 1012. An external force needs to be applied to the second connector 201 or the first connector 101 to cause the second connector 201 to get away from the first connector 101. After the external force is removed, the second connector 201 approaches the first connector 101 under the effect of the restoring force of the fourth elastic element 70. In other embodiments, the fourth elastic element also may be a rectangular spring sleeved on a telescopic rod, and the telescopic rod is connected between the second connector and the supporting portion.

In the embodiment, the third position and the fourth position are arranged between the second inner side surface 21 and the second outer side surface 22, the third position is adjacent to the second inner side surface 21, and the fourth position is adjacent to the second outer side surface 22. The second sliding element 20 is parallel to the first sliding element 10. Specifically, the second sliding element 20 is a housing, and the second sliding element 20 is hollow to define a second receiving cavity (not indicated). An opening end of the second receiving cavity is defined on the second inner side surface 31 so that the second connector 201 can be received in the second receiving cavity via the opening end. Two second slide guiding strips 201*b* are received in the second receiving cavity, and the second slide guiding strips 201*b* are fixed to an inner wall of the second receiving cavity to extend from the second inner side surface 21 to the second outer side surface 22. The second sliding slot 231 is provided between the two second slide guiding strips 201*b*, and the second connector 201 can be slid back and forth between the second inner side surface 21 and the second outer side surface 22. When the second connector 201 gets close to the second inner side surface 21, i.e., the second connector 201 is slid to the third position, and meanwhile the second connector 201 approaches the supporting portion 1012 of the first connector 101 under the elastic effect of the fourth elastic element 50, the second sliding element 20 is unfolded relative to the first sliding element 10, and the second sliding element 20 is slid to the second state. When the second connector 201 gets close to the second outer side surface 42, i.e., the second connector 201 is slid to the fourth position, the second outer side surface 22 of the second sliding element 20 is located at a position where the first extension surface 13 is adjacent to the first inner side surface 11, the supporting portion 1012 of the first connector 101 is slid into the first sliding slot 131, then the first extension surface 13 of the first sliding element 10 is overlapped with the second bottom surface 24 of the second sliding element 20.

in the embodiment, the first side edge 311 of the flexible screen 30 is fixed to the first outer side surface 12, and the second side edge 321 of the flexible screen 30 is fixed to the second outer side surface 22.

Furthermore, in the embodiment, the second bottom surface 24 defines a groove 242. When the second sliding element 20 is slid to the second state, the supporting portion 1012 of the first connector 101 is slid out of the first sliding slot 131, i.e., the first connector 101 is at least partially slid out of the first sliding slot 131, and the supporting portion 1012 of the first connector 101 is received in the groove 242.

In the embodiment, the thickness of the first sliding element 10 is equivalent to that of the second sliding element 20. When the supporting portion 1012 of the first connector 101 is slid out of the first sliding slot 131, the second connector 201 approaches the supporting portion 1012 of the first connector 101, and the second sliding element 20 and the first sliding element 10 are arranged side by side. By means of that the supporting portion 1012 of the first connector 101 is received in the groove 242, and that the first bottom surface 14 is flush with the second bottom surface 24, the first sliding element 10 and the second sliding element 20 can be arranged side by side into a plate with a flat surface, so that a supporting device of the flexible screen 30 can have a bigger dimension, and the flexible screen 30 also can be made to be flat.

Furthermore, referring to FIG. 12, FIG. 13, FIG. 14, and FIG. 15, in the embodiment, the first extension surface 13 defines a first guiding slot 132 extending through the first sliding slot 131, and the first guiding slot 132 extends along a direction parallel to the first sliding element 10. When the second sliding element 20 is slid to the first state, the supporting portion 1012 of the first connector 101 is slid into the first sliding slot 131, and an end of the fourth elastic element 70 adjacent to the first connector 101 is slidably connected to the first guiding slot 132. The second sliding element 20 defines a second guiding slot 232. The second guiding slot 232 extends along a direction parallel to the second sliding element 20, and an end of the fourth elastic element 70 adjacent to the second connector 201 is slidably connected to the second guiding slot 232. Specifically, the groove 241 extends through the second guiding slot 232. When the second sliding element 20 is slid to the first state, an end of the fourth elastic element 70 adjacent to the second connector 201 is slidably connected to the second guiding slot 232.

In the embodiment, the extending direction of the first guiding slot 132 is parallel to the sliding direction of the first connector 101, and the first guiding slot 132 defines an opening (not indicated) on the first inner side surface 11. An end of the fourth elastic element 70 adjacent to the first connector 101 is slid into or out of the first guiding slot 132 from the opening, thus the first connector 101 is enabled to slide smoothly. Likewise, the extending direction of the second guiding slot 232 is parallel to the sliding direction of the second connector 20, the second inner side surface 21 of the second guiding slot 232 defines an opening, and the fourth elastic element 70 is slide from the opening into the second guiding slot 232. It can be understood that the second guiding slot 232 may be provided with a limiting portion (not indicated) at a position away from the second inner side surface 22. When the fourth elastic element 70 is slid along the second guiding slot 232 and abuts against the limiting portion, the limiting portion pushes the second sliding element 20 to move towards the first outer side surface 12 of the first sliding element 10, then the limiting portion pushes the fourth elastic element 70 to move towards the first outer side surface 12, thereby driving the first connector 101 to slide into the first sliding slot 131. Thus, it is convenient to stack the first sliding element 10 and the second sliding element 40, and slide the second sliding element 20 to the first state, so that the flexible screen assembly 100 saves labor and has a stable structure.

Figure 15:
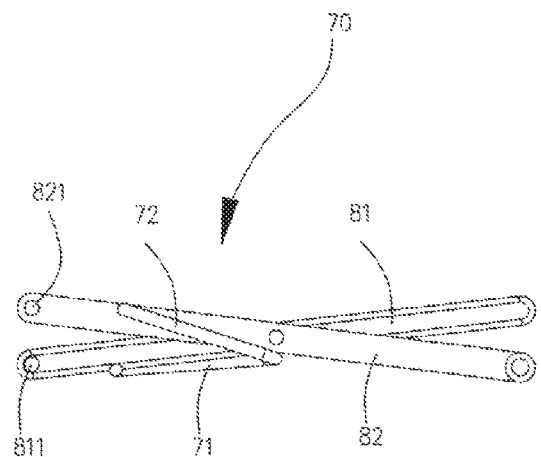
FIG. 15 is a schematic view of a fourth elastic element of the flexible screen assembly of FIG. 12.

Furthermore, referring to FIG. 14 and FIG. 15, the flexible screen structure 100 includes a third guiding mechanism 80. The third guiding mechanism 80 is connected between the first connector 101 and the second connector 201, so that the first connector 101 and the second connector 201 can be slid relatively in a direction perpendicular to the first sliding element 10, i.e., the first connector 101 and the second connector 201 may get close to or away from each other.

In the embodiment, the third guiding mechanism 80 includes a first rocking bar 81 and a second rocking bar 82. The first rocking bar 81 includes a first rotation end 811, and a first sliding end 812 arranged opposite to the first rotation end 811. The first rotation end 811 is rotatably connected to the supporting portion 1012 of the first connector 101, the first sliding end 812 is slidably connected to the second connector 201, and a rotation surface of the first rocking bar 81 is perpendicular to the first extension surface 13. The second rocking bar 82 includes a second rotation end 821, and a second sliding end 822 arranged opposite to the second rotation end 821. The second rotation end 821 is rotatably connected to the second connector 201 and is arranged opposite to the first rotation end 811. The second sliding end 822 is slidably connected to the supporting portion 1012 of the first connector 101 and is arranged opposite to the first sliding end 812. A rotation surface of the second rocking bar 82 is parallel to the rotation surface of the first rocking bar 81.

In the embodiment, a side of the supporting portion 1012 of the first connector 101 facing away from the first bottom surface 14 is provided with a first rotation shaft 1013 and a first clamping groove 1014. The axial direction of the first rotation shaft 1013 is parallel to the first sliding element 10, and is perpendicular to the sliding direction of the first connector 101. The first rotation end 811 of the first rocking bar 81 is rotatably connected to the first rotation shaft 1013.

The first clamping groove 1014 is arranged at a side of the first rotation shaft 1013. The extending direction of the first clamping groove 1014 is parallel to the sliding direction of the first connector 101, and is located within the rotation surface of the first rocking bar 81. The second sliding end 822 is slidably connected to the first clamping groove 1014. A side of the second connector 201 facing away from the second extension surface 23 is provided with a second rotation shaft 2013 and a second clamping groove 2014. The axial direction of the second rotation shaft 2013 is parallel to the second sliding element 20, and is perpendicular to the sliding direction of the second connector 201. The second rotation end 821 of the second rocking bar 82 is rotatably connected to the second rotation shaft 2013. The second clamping groove 2014 is arranged at a side of the second rotation shaft 2013. The extending direction of the second clamping groove 2014 is parallel to the sliding direction of the second connector 201, and is located within the rotation surface of the second rocking bar 82. The first sliding end 812 is slidably connected to the second clamping groove 2014. By means of that the first rocking bar 81 and the second rocking bar 82 are rotated around the first rotation shaft 101 and the second rotation shaft 401 respectively, and that the first sliding end 812 and the second sliding end 822 are slid in the second clamping groove 2014 and the first clamping groove 1014 respectively, the sliding direction of the first connector 101 relative to the second connector 201 is perpendicular to the first sliding element 10. The first rocking bar 81 and the second rocking bar 82 serve a function of guiding the first connector 101 and the second connector 201, so that the structure of the flexible screen assembly 100 is more stable. In other embodiments, the first connector 101 also may define a guiding hole, and the second connector 201 may be provided with a guiding post. In other embodiments, the first rocking bar 81 alone or the second rocking bar 82 alone may be arranged between the first connector 101 and the second connector 201.

Furthermore, an end of the fourth elastic element 70 is fixed to the first rocking bar 81, and another end is fixed to the second rocking bar 82. In the embodiment, the fourth elastic element 70 is formed by a bent iron wire, and the fourth elastic element 70 includes a first force arm 71 (see FIG. 15) and a second force arm 72 (see FIG. 15). An included angle between the first force arm 71 and the second force arm 72 is an acute angle. The first force aria 71 is fixed to the first rocking arm 81 and adjacent to the first rotation end 811. The second force arm 72 is fixed to the second rocking bar 82 and adjacent to the second rotation end 821. Certainly, in other embodiments, if the fourth elastic element 70 is a rectangular spring, an end of the fourth elastic element 70 also can be fixed to the first rotation shaft 1013, and another end is fixed to the second rotation shaft 2013.

Furthermore, the first guiding mechanism 101*a* includes a fifth elastic element 101*c*. The fifth elastic element 101*c* is connected between the first connector 101 and the first sliding element 10 for providing a propelling force to the first connector 101 sliding to the first position or the second position.

In the embodiment, the connecting portion 1011 of the first connector 101 defines an aperture (not indicated). A bottom end of the aperture is fixedly connected to an end of the fifth elastic element 101*c*, and another end of the fifth elastic element 101*c* is fixed in the first sliding slot 131. By means of the aperture, it is convenient to receive the fifth elastic element 101*c*. Two such fifth elastic elements 101*c* are connected between the connecting portion 1011 and the first sliding element 10. The fifth elastic elements 101*c* are irregular springs. The fifth elastic elements 101*c* extend along an "S" curve. An end of each of the two fifth elastic elements 101*c* is fixed to the bottom end of the aperture, and the other ends of the two fifth elastic elements 101*c* are fixed to the two first slide guiding strips respectively. When the connecting portion 1011 of the first connector 101 gets close to the first inner side surface 11, under the effect of the force of the fifth elastic elements 101*c*, the supporting portion 1012 of the first connector 101 is slid out of the first sliding slot 131, i.e., under the effect of the elastic force of the fifth elastic elements 101*c*, the first connector 101 is slid to the outside of the second sliding element, so that the second sliding element 20 is slid to the second state. When the connecting portion 1011 of the first connector 101 gets close to the first outer side surface 12, under the force of the fifth elastic elements 101*c*, the supporting portion 1012 of the first connector 101 is slid to the first sliding slot 131, i.e., the first connector 101 is slid to the first position, thus the second sliding element 20 is slid to the second state. In other embodiments, the second elastic elements also may be rectangular springs.

Furthermore, the second guiding mechanism 201*a* includes a sixth elastic element 201*c*. The sixth elastic element 201*c* is connected between the second sliding element 20 and the second connector 201, and the sixth elastic element 201*c* is configured to provide a propelling force to the second connector 201 sliding to the third position or the fourth position.

In the embodiment, the sixth elastic element 201*c* is a torsion spring, and two such sixth elastic elements 201*c* are connected between the second connector 201 and the second sliding element 20. An end of each of the two sixth elastic elements 201*c* is fixed to the second connector 201, and other ends of the two sixth elastic elements 201*c* are fixed to the two second slide guiding strips respectively. When the second connector 201 gets close to the second inner side surface 21 under the force of the sixth elastic elements 201*c*, the second connector 201 gets close to the second inner side surface 21, so that the first sliding element 10 is unfolded relative to the second sliding element 20, i.e., facilitating sliding the second sliding element 20 to the second state. When the second connector 201 gets close to the second outer side surface 22, under the force of the sixth elastic elements 201*c*, the second connector 201 gets close to the second outer side surface 22, so that the first sliding element 10 is overlapped with the second sliding element 20, facilitating sliding the second sliding element 20 to the first state. In other embodiments, the sixth elastic elements also may be rectangular springs.

The present disclosure further provides a terminal (not indicated). The terminal includes the flexible screen assembly 100. The terminal further includes a battery, a signal input device, and a central processing unit. All of the battery (not shown), the signal input device (not shown), and the central processing unit (not shown) can be mounted in the first sliding element 10 and the second sliding element 20. The signal input device is electrically coupled to the central processing unit for receiving a signal and transmitting the signal to the central processing unit. The flexible screen assembly is electrically coupled to the central processing unit for acquiring a signal from the central processing unit and outputting the signal. The central processing unit is configured to acquire a signal from the signal input device, process the signal, and transmit the processed signal to the signal output device. The battery supplies power to the central processing unit, the flexible screen assembly, and the signal input device.

In the embodiment, the terminal is a mobile phone. After acquiring an instruction signal from the central processing unit, the flexible screen assembly 100 outputs an image signal. The signal input device may be a virtual key and also may be a physical key. When a user operates the signal input device to input an instruction to the signal input device, the signal input device inputs an instruction signal to the central processing unit. The central processing unit performs operation processing based on the instruction signal, thus various functions of the terminal are realized. Certainly, in other embodiments, the terminal also may be a Bluetooth-enabled speaker, or a tablet computer, the signal input device may be a Bluetooth receiver, and the signal output device also may be a trumpet.

The above-mentioned are merely for preferable embodiments of the present disclosure. It should be indicated that a person ordinarily skilled in the aft still can make several improvements and modifications within the principle of the present disclosure, and these improvements and modifications also should be considered as the protection scope of the present disclosure.

What is claimed is:

1. A flexible screen assembly, comprising:
   a first sliding element;
   a second sliding element slidably connected to the first sliding element, and being slidable to a first state that the second sliding element is overlapped with the first sliding element, and to a second state that the second sliding element is unfolded with respect to the first sliding element; and
   a flexible screen connected to the first sliding element and the second sliding element;
   wherein in the first state, a portion of the flexible screen covers the second sliding element, and another portion of the flexible screen is received into the first sliding element or the second sliding element;
   wherein in the second state, the flexible screen is unfolded on the first sliding element and the second sliding element.

2. The flexible screen assembly of claim 1, wherein the first sliding element is provided with a first rotation shaft, a side edge of the flexible screen adjacent to the first sliding element is fixed to a peripheral side of the first rotation shaft, and the first rotation shaft is operable to wind or unfold a portion of the flexible screen adjacent to the first sliding element.

3. The flexible screen assembly of claim 1, wherein the first sliding element is provided with a first rotation shaft, a side edge of the flexible screen adjacent to the first sliding element bypasses a peripheral side of the first rotation shaft, a first elastic element is connected between the flexible screen and the first sliding element, and the first elastic element is operable to provide a restoring force to receive the flexible screen into the first sliding element.

4. The flexible screen assembly of claim 1, wherein the first sliding element further comprises a first extension surface, the second sliding element further comprises a second extension surface, in the second state, the second extension surface and the first extension surface are coplanar and have the same orientation, and the flexible screen is unfolded on the first extension surface and the second extension surface.

5. The flexible screen assembly of claim 4, wherein the first sliding element comprises a first inner side surface, and an included angle is defined between the first inner side surface and the first extension surface; the second sliding element comprises a second inner side surface, and an included angle is defined between the second inner side surface and the second extension surface; when the second sliding element is slid to the second state, the first inner side surface and the second inner side surface have opposite orientations and fit with each other.

6. The flexible screen assembly of claim 5, wherein the included angle between the first inner side surface and the first extension surface is an obtuse angle.

7. The flexible screen assembly of claim 5, wherein a side of the first sliding element opposite to the first inner side surface is provided with a second rotation shaft, the second rotation shaft is adjacent to the first extension surface, and is axially parallel to the first rotation shaft, and the flexible screen bypasses a peripheral side portion of the second rotation shaft and extends to the first extension surface.

8. The flexible screen assembly of claim 5, wherein the first inner side surface is provided with a first fixing element, the second inner side surface is provided with a second fixing element, and when the first inner side surface fits with the second inner side surface, the first fixing element is fixedly connected to the second fixing element.

9. The flexible screen assembly of claim 5, wherein the first inner side surface is provided with a first positioning portion, the second inner side surface is provided with a second positioning portion, and when the first inner side surface fits with the second inner side surface, the first positioning portion engages with the second positioning portion.

10. The flexible screen assembly of claim 5, wherein the first extension surface is provided with a third fixing element, a side of the second sliding element facing away from the second extension surface is provided with a fourth fixing element, and when the second sliding element is slid to the first state, the third fixing element is fixedly connected to the fourth fixing element.

11. The flexible screen assembly of claim 1, wherein the flexible screen assembly further comprises a second elastic element, and the second elastic element is elastically connected between the first sliding element and the second sliding element to provide an elastic force to the second sliding element sliding from the first state to the second state.

12. The flexible screen assembly of claim 1, wherein the flexible screen assembly further comprises a connecting rod, an end of the connecting rod is rotatable and is slidably connected to the first sliding element, and another end of the connecting rod is rotatably connected to the second sliding element, wherein following sliding of the second sliding element relative to the first sliding element, the connecting rod is slid relative to the first sliding element, and the connecting rod is rotated relative to the first sliding element and the second sliding element when the second sliding element is slid from the state that the second sliding element is overlapped with the first sliding element to the state that the second sliding element is unfolded with respect to the first sliding element.

13. The flexible screen assembly of claim 12, wherein the first sliding element defines a sliding slot, a first connecting rod rotation shaft is slidably connected in the sliding slot, the first connecting rod rotation shaft is rotatably connected to an end of the connecting rod, the second sliding element is provided with a second connecting rod rotation shaft parallel to the first connecting rod rotation shaft, and the second connecting rod rotation shaft is rotatably connected to another end of the connecting rod.

14. The flexible screen assembly of claim 13, wherein an end of the first sliding element is provided with a first limiting portion adjacent to the sliding slot, and in the second state, the first limiting portion abuts against a peripheral side of the connecting rod to prevent further rotation of the connecting rod relative to the first sliding element.

15. The flexible screen assembly of claim 13, wherein the second sliding element is provided with a second limiting portion at a position adjacent to the second connecting rod rotation shaft, and in the second state, the second limiting portion abuts against a peripheral side of the connecting rod to prevent further rotation of the connecting rod relative to the second sliding element.

16. The flexible screen assembly of claim 13, wherein the first sliding element is provided with an abutment portion outside the sliding slot, a third elastic element is connected between the abutment portion and the first connecting rod rotation shaft, and the third elastic element is operable to provide a pushing force to the first connecting rod rotation shaft sliding to two ends of the sliding slot.

17. The flexible screen assembly of claim 1, wherein the flexible screen assembly further comprises a first connector, a second connector, and a fourth elastic element, the first sliding element is provided with a first guiding mechanism, the first sliding element is slidably connected to the first guiding mechanism along a first direction, and under guidance of the first guiding mechanism, the first sliding element is slidable to a first position where the first sliding element is overlapped with the first sliding element and a second position where a dislocation is generated between at least a portion of the first sliding element and the first sliding element; the second sliding element is provided with a second guiding mechanism, the second connector is slidably connected to the second guiding mechanism along a second direction, and under guidance of the second guiding mechanism, the second connector is slidable to a third position adjacent to the first sliding element and a fourth position away from the first sliding element, and the second direction is parallel to the first direction;

in the first state, the first connector is located in the first position and the second connector is located in the fourth position; in the second state, the first connector is located in the second position and the second connector is located in the third position, and the first sliding element and the second sliding element keep side by side under an elastic effect of the fourth elastic element.

18. The flexible screen assembly of claim 17, wherein the first guiding mechanism defines a first sliding slot, and the first connector is slidably connected to the first sliding slot; the second guiding mechanism defines a second sliding slot, and the second connector is slidably connected to the second sliding slot.

19. The flexible screen assembly of claim 17, wherein the flexible screen assembly comprises a third guiding mechanism, the third guiding mechanism comprises a first rocking bar, the first rocking bar comprises a first rotation end, and a first sliding end arranged opposite to the first rotation end, the first rotation end is rotatably connected to the first connector, the first sliding end is slidably connected to the second connector, and a rotation surface of the first rocking bar is parallel to a direction in which the first connector gets close to the second connector.

20. The flexible screen assembly of claim 17, wherein the first guiding mechanism comprises a fifth elastic element, the fifth elastic element is connected between the first connector and the first sliding element for providing a propelling force to the first connector sliding to the first position or the second position.

21. The flexible screen assembly of claim 17, wherein the second guiding mechanism comprises a sixth elastic element, the sixth elastic element is connected between the second connector and the second sliding element, and the sixth elastic element is configured to provide a propelling force to the second connector sliding to the third position or the fourth position.

* * * * *